3,043,040
METHOD OF TRANSFORMING NEW BRICKS INTO BRICKS WHICH SIMULATE AGED BRICKS
Tony Christiano Silva, 1117 W. Chase, El Cajon, Calif.
No Drawing. Filed Sept. 6, 1957, Ser. No. 682,290
4 Claims. (Cl. 41—26)

The present invention relates to the method of transforming new or relatively new, red, fired clay bricks, which do not simulate aged bricks, into bricks that have the same eye appearance as aged, red, fired clay bricks.

In practicing my invention, I make several separate mixtures that I apply to the bricks, to wit: (1) A mixture of light color or grey cement, plaster sand, water and lime, and (2) a dark color or dark grey cement, plaster sand, water and lime, and (3) a white cement, plaster sand, water and lime. The new or relatively new bricks, preferably culls, are dampened in water; then they are daubed with one or more of these mixtures; these bricks so treated are maintained wet for from one to three days, depending on the porosity of the bricks; then the bricks are permitted to dry thoroughly in the open air, that is for from one to three days, depending upon the relative humidity of the air; the bricks are then subjected to a smoky fire, as for example they are subjected to the heat and smoke of burning of black felt paper; the length of burning is sufficient to set, permanently, the mixture in and on the bricks.

Preferably the proportions of any of the three aforementioned mixtures comprises: Two cement, four plaster, and one lime. These mixtures simulate, when the processes are completed, respectively (1) light grey, (2) dark grey, and (3) white, or nearly white.

Preferably the bricks, after being treated and dried, are placed in a pile; then black felt paper is torn into shreds or small pieces, placed above and about the pile of bricks, and then ignited. The top bricks, after having the desired simulated appearance, are withdrawn from the pile, the black felt paper being added continuously to the fire when the upper bricks are removed, so as to assure the finishing of the then uppermost bricks of the pile. The black felt paper contains asphaltic constituents. Asphalt contains combustible hydrocarbons which burn with a smoky flame, due to the fact that there are relatively large amounts of uncombusted carbon particles in the smoke. Some of these uncombusted carbon particles adhere to the bricks and become permanently locked in the pores of the heated bricks and serve to impart the source of the darkness desirable in aged bricks.

I have discovered that when the desired appearances of old bricks are brought forth during the heating operation, the mixture is permanently set. Further heating, in the above manner, merely causes further darkening of the bricks; and, in this manner, the desired darkness can be obtained.

By skillful observance of the color characteristics of old brick, and by skillful daubing application of a mixture and preferably a plurality of the mixtures, and by skillful heating and withdrawing bricks from the fire, the various color characteristics of aged bricks can be simulated.

Preferably cull bricks are used since they are far less expensive and inherently lend themselves to simulation of aged bricks.

I claim:
1. The process of forming red, previously fired clay bricks to those simulating aged red, fired clay bricks which comprises: Spot-coating portions of the red, previously fired clay bricks with wet mortar; then, after the bricks are thoroughly dry, treating the bricks with asphalt by shredding the asphalt over a pile of bricks and then burning the asphalt.

2. The process of forming red, previously fired clay bricks to those simulating aged red, fired clay bricks which comprises: Spot-coating portions of the red-previously fired clay bricks with a mixture of cement, plaster sand, lime and water; then, after the bricks are thoroughly dry treating the bricks with asphalt by shredding the asphalt over a pile of bricks and then burning the asphalt.

3. The process of forming red, previously fired clay bricks to those simulating aged red, fired clay bricks which comprises: Spot-coating portions of the red, previously fired clay bricks with wet mortar; maintaining the bricks wet for a period of twelve to thirty-six hours; then, after the bricks are thoroughly dry, treating the bricks with asphalt by shredding the asphalt over a pile of bricks and then burning the asphalt.

4. The process of forming red, previously fired clay bricks to those simulating aged, red, fired clay bricks which comprises: treating the bricks with asphalt by shredding the asphalt over a pile of bricks and then burning the asphalt.

References Cited in the file of this patent

UNITED STATES PATENTS

| | | |
|---|---|---|
| 1,958,837 | Ramsay | May 15, 1934 |
| 2,107,146 | Dreher | Feb. 1, 1938 |
| 2,764,510 | Ziegler | Sept. 25, 1956 |
| 2,791,522 | Gross | May 7, 1957 |
| 2,880,120 | Pelle | Mar. 31, 1959 |

OTHER REFERENCES

Searle: Modern Brick Making, 4th edition, Ernest Benn, Ltd., London, 1956, pages 575, 576 relied on.
Searle: Modern Brick Making, 4th edition, Ernest Benn, Ltd., London, 1956, pp. 25–26.